(12) United States Patent  
Urano et al.

(10) Patent No.: US 10,118,617 B2  
(45) Date of Patent: Nov. 6, 2018

(54) VEHICLE CONTROL SYSTEM

(71) Applicant: TOYOTA JIDOSHA KABUSHIKI KAISHA, Toyota-shi, Aichi-ken (JP)

(72) Inventors: Hiromitsu Urano, Numazu (JP); Kunihito Satou, Mishima (JP); Kentaro Ichikawa, Shizuoka (JP); Taisuke Sugaiwa, Susono (JP); Bunyo Okumura, Susono (JP); Maiko Hirano, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/806,961

(22) Filed: Nov. 8, 2017

(65) Prior Publication Data

US 2018/0148054 A1     May 31, 2018

(30) Foreign Application Priority Data

Nov. 29, 2016   (JP) ................................ 2016-231598

(51) Int. Cl.
*B60W 30/16*   (2012.01)
*B60W 10/06*   (2006.01)
(Continued)

(52) U.S. Cl.
CPC ............ *B60W 30/16* (2013.01); *B60W 10/06* (2013.01); *B60W 10/18* (2013.01); *B60W 10/20* (2013.01); *B60W 10/08* (2013.01); *B60W 2420/42* (2013.01); *B60W 2420/52* (2013.01); *B60W 2520/04* (2013.01); *B60W 2520/10* (2013.01); *B60W 2550/302* (2013.01); *B60W 2550/306* (2013.01); *B60W 2550/308* (2013.01)

(58) Field of Classification Search
CPC ...... B60W 30/16; B60W 10/20; B60W 10/06; B60W 10/18; B60W 2520/10; B60W 2550/302; B60W 2420/42; B60W 2550/308; B60W 2420/52; B60W 10/08; B60W 2520/04; B60W 2550/306
USPC ....... 701/96, 93, 301, 41; 340/435; 180/170, 180/179
See application file for complete search history.

(56) References Cited

U.S. PATENT DOCUMENTS 8,781,721 B2 * 7/2014 Dowdall ................. B60R 21/00
                                                  701/301
2010/0286887 A1 * 11/2010 Maruyama ............... B60T 7/22
                                                  701/96

(Continued)

FOREIGN PATENT DOCUMENTS

JP   11-291790 A    10/1999
JP   2000-231700 A  8/2000
(Continued)

*Primary Examiner* — Shardul D Patel
(74) *Attorney, Agent, or Firm* — Sughrue Mion, PLLC

(57) ABSTRACT

A vehicle control system includes an actuator and an electronic control unit. The electronic control unit is configured to determine one of the following conditions is satisfied: (i) an adjacent vehicle has started; (ii) a first timing at which the preceding vehicle has started does not indicate a second timing at which a slipping-by vehicle has been lost; and (iii) a second preceding vehicle has started. The electronic control unit is configured to start the host vehicle by using the actuator when at least one of the conditions is satisfied.

9 Claims, 7 Drawing Sheets

(51) Int. Cl.
*B60W 10/18* (2012.01)
*B60W 10/20* (2006.01)
*B60W 10/08* (2006.01)

(56) References Cited

U.S. PATENT DOCUMENTS

| | | | | |
|---|---|---|---|---|
| 2013/0138320 A1* | 5/2013 | Aso | ............... | B60W 30/16 |
| | | | | 701/96 |
| 2016/0009283 A1* | 1/2016 | Tokimasa | ............... | B60W 30/16 |
| | | | | 701/96 |
| 2017/0327117 A1* | 11/2017 | Ochi | ............... | B60K 31/00 |
| 2018/0088572 A1* | 3/2018 | Uchida | ............... | B60W 50/14 |

FOREIGN PATENT DOCUMENTS

| | | | |
|---|---|---|---|
| JP | 2010-285145 A | 12/2010 | |
| JP | 2016-021099 A | 2/2016 | |

* cited by examiner

VEHICLE CONTROL SYSTEM

INCORPORATION BY REFERENCE

The disclosure of Japanese Patent Application 2016-231598 filed on Nov. 29, 2016 including the specification, drawings and abstract is incorporated herein by reference in its entirety.

BACKGROUND

1. Technical Field

The present disclosure relates to a vehicle control system.

2. Description of Related Art

A preceding vehicle start notification device is known that notifies the host vehicle that the preceding vehicle has started when the host vehicle and its preceding are stationary (see Japanese Patent Application Publication No. 2000-231700 (JP 2000-231700 A)). This preceding vehicle start notification device sends a detection wave in the moving direction of the host vehicle and, based on the reception result of the detection wave reflected by an object, determines that the preceding vehicle has started.

SUMMARY

Recently, there is a need for a vehicle control system that autonomously starts a vehicle when the preceding vehicle starts. However, when the detection wave is used to determine whether the preceding vehicle has started as in the preceding vehicle start notification device described above, there is a possibility that, if a motorcycle that has slipped by the stationary host vehicle approaches the stationary preceding vehicle, the motorcycle and the preceding vehicle are sometimes detected erroneously as one object. In a vehicle control system that autonomously starts a vehicle, a problem arises that, if an erroneous determination is made that the preceding vehicle has started, the host vehicle will autonomously start. This also applies to the case when an object is detected based on the information captured by a camera. That is, there is also a possibility that a motorcycle and the preceding vehicle are detected erroneously as one object and, as a result, an erroneous determination is made that the preceding vehicle has started.

In view of the foregoing, the present disclosure provides a vehicle control system that can prevent a stationary host vehicle from starting if it is erroneously determined, due to a slipping-by vehicle, that the preceding vehicle has started.

A vehicle control system includes an actuator; and an electronic control unit. The electronic control unit is configured to recognize a vehicle speed of a host vehicle, recognize a surrounding environment of the host vehicle, determine, based on the vehicle speed of the host vehicle and the surrounding environment, whether the host vehicle and a preceding vehicle ahead of the host vehicle are stationary, determine, based on the surrounding environment, whether the preceding vehicle has started in a case where it is determined that the host vehicle and the preceding vehicle are stationary, determine, when it is determined that the host vehicle and the preceding vehicle are stationary, whether one of conditions is satisfied. The conditions includes (i) a first condition for determining, based on the surrounding environment, that an adjacent vehicle which is another vehicle stationary adjacent to the host vehicle in an adjacent lane adjacent to a traveling lane in which the host vehicle travels has started, (ii) a second condition for determining, based on the surrounding environment, that a first timing at which the preceding vehicle has started does not indicate a second timing at which a slipping-by vehicle which is a vehicle that slips by the host vehicle for moving ahead of the host vehicle has been lost, and (iii) a third condition for determining, based on the surrounding environment, that a second preceding vehicle has started. The second preceding vehicle is another vehicle stationary ahead of the preceding vehicle in the traveling lane. The electronic control unit is configured to start the host vehicle by using the actuator when at least one of the first condition, second condition, and third condition is satisfied.

In the aspect, the electronic control unit may be configured to determine, when it is determined that the host vehicle and the preceding vehicle are stationary, whether there is the adjacent vehicle based on the surrounding environment, and determine, based on the surrounding environment, whether the adjacent vehicle has started when it is determined that there is the adjacent vehicle and it is determined that the preceding vehicle has started. The electronic control unit may be configured to start the host vehicle by using the actuator when it is determined that there is the adjacent vehicle and it is determined that the adjacent vehicle has started, and not to start the host vehicle when it is determined that there is the adjacent vehicle and it is not determined that the adjacent vehicle has started.

In the vehicle control system according to one aspect of the present disclosure, if the host vehicle and the preceding vehicle are stationary and if there is a stationary adjacent vehicle, the vehicle control system does not start the host vehicle until it is determined that the adjacent vehicle has started even if it is determined that the preceding vehicle has started. Therefore, even if it is erroneously determined, due to a slipping-by vehicle that slips by the host vehicle for moving ahead of the host vehicle, that the preceding vehicle has started, the vehicle control system does not start the host vehicle until it is determined that the adjacent vehicle has started, thus preventing the stationary host vehicle from starting due to an erroneous determination.

In the aspect, the electronic control unit may be configured to determine, when it is determined that the host vehicle and the preceding vehicle are stationary, whether there is the adjacent vehicle based on the surrounding environment, determine, when it is determined that there is the adjacent vehicle and it is determined that the preceding vehicle has started, whether the adjacent vehicle has started based on the second surrounding environment, determine, when it is determined that there is the adjacent vehicle, whether the slipping-by vehicle has been lost based on the surrounding environment, and determine whether the first timing indicates the second timing when it is determined that the slipping-by vehicle has been lost and it is determined that the preceding vehicle has started. The electronic control unit may be configured to start the host vehicle by using the actuator when it is determined that the preceding vehicle has started and it is not determined that the first timing indicates the second timing, and not to start the host vehicle until it is determined that the adjacent vehicle has started, when the preceding vehicle has started and it is determined that the first timing indicates the second timing.

In the vehicle control system according to another aspect of the present disclosure, if it is determined that the preceding vehicle has started when the host vehicle and the preceding vehicle are stationary but if the preceding vehicle starting timing indicates the slipping-by vehicle losing timing, the possibility increases that the start of the preceding vehicle is erroneously determined. Considering this possibility, the vehicle control system does not start the host vehicle until it is determined that the stationary adjacent vehicle has started. Therefore, this vehicle control system makes it possible to prevent the stationary host vehicle from starting if it is erroneously determined, due to a slipping-by vehicle, that the preceding vehicle has started.

In the aspect, the electronic control unit may be configured to recognize the surrounding environment, by using a predetermined standard recognition setting, and recognize the surrounding environment by using a high accuracy recognition setting higher in recognition accuracy than the standard recognition setting, when the host vehicle does not start based on a condition that electronic control unit does not determines that the adjacent vehicle has started.

In this vehicle control system, if it is determined that the preceding vehicle has started but if the start of the host vehicle is suspended because it is not determined that the adjacent vehicle has started, the vehicle control system recognizes the surrounding environment using the high accuracy recognition setting that is higher in recognition accuracy than the standard recognition setting, thus preventing a situation in which the host vehicle cannot start because the start of the adjacent vehicle cannot be determined due to an insufficient recognition accuracy.

In the aspect, the electronic control unit may be configured to determine, when it is determined that the host vehicle and the preceding vehicle are stationary, whether there is the second preceding vehicle based on the surrounding environment, and determine, when it is determined that there is the second preceding vehicle and it is determined that the preceding vehicle has started, whether the second preceding vehicle has started based on the surrounding environment. The electronic control unit may be configured to start the host vehicle by using the actuator when it is determined that there is the second preceding vehicle and it is determined that the second preceding vehicle has started, and not to start the host vehicle when it is determined that there is the second preceding vehicle and it is not determined that the second preceding vehicle has started.

In the vehicle control system in a still another aspect of the present disclosure, if it is determined that the preceding vehicle has started when the host vehicle and the preceding vehicle are stationary but if there is a stationary second preceding vehicle, this vehicle control system does not start host vehicle until it is determined that the second preceding vehicle has started. Therefore, even if it is erroneously determined, due to a slipping-by vehicle that slips by the host vehicle for moving ahead of the host vehicle, that the preceding vehicle has started, this vehicle control system does not start the host vehicle until it is determined that the second preceding vehicle has started, thus preventing the stationary host vehicle from starting due to an erroneous determination. In addition, even when there is no adjacent lane that is adjacent to the traveling lane of the host vehicle, this vehicle control system determines whether the second preceding vehicle has started, thus preventing the stationary host vehicle from starting if it is erroneously determined, due to a slipping-by vehicle, that the preceding vehicle has started.

In the aspect, the electronic control unit may be configured to recognize the surrounding environment, by using a predetermined standard recognition setting, and recognize the surrounding environment, by using a high accuracy recognition setting higher in recognition accuracy than the standard recognition setting, when the host vehicle does not start based on a condition that the electronic control unit does not determine that the second preceding vehicle has started.

In this vehicle control system, if it is determined that the preceding vehicle has started but if the start of the host vehicle is suspended because it is not determined that the second preceding vehicle has started, the vehicle control system recognizes the surrounding environment using the high accuracy recognition setting that is higher in recognition accuracy than the standard recognition setting, thus preventing a situation in which the host vehicle cannot start because the start of the second preceding vehicle cannot be determined due to an insufficient recognition accuracy.

In the aspect, the slipping-by vehicle may pass by a side of the host vehicle and approaches the preceding vehicle.

In the aspect, the electronic control unit may determine that the first timing indicates the second timing, when the first timing is within a predetermined time from the second timing.

In the aspect, the electronic control unit may determine that the slipping-by vehicle has been lost when the slipping-by vehicle becomes undetectable.

As described above, the present disclosure can prevent a stationary host vehicle from starting if it is erroneously determined, due to a slipping-by vehicle, that a preceding vehicle has started.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of the present disclosure will be described in detail below with reference to the drawings.

First Embodiment

Figure 1:
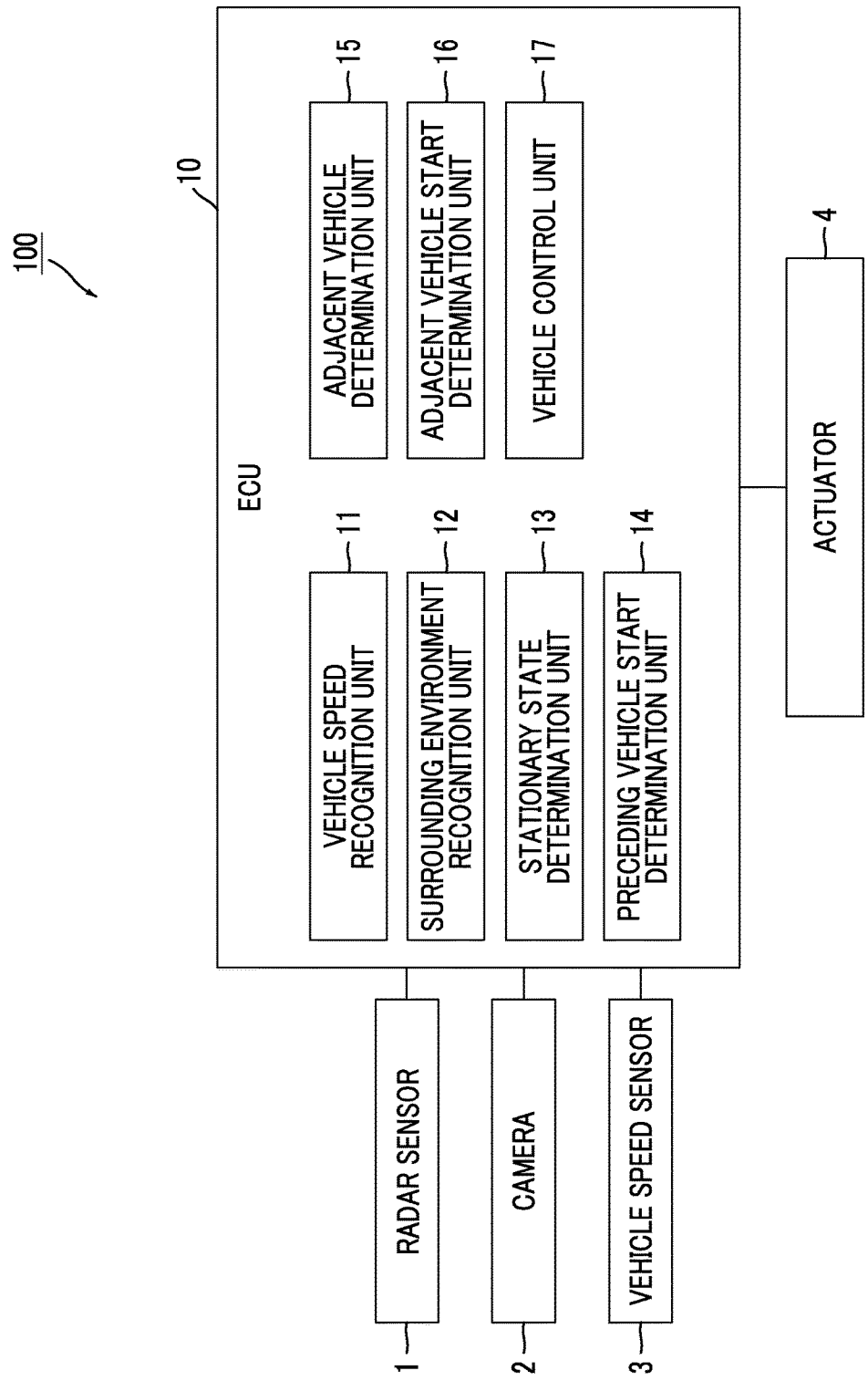
FIG. 1 is a block diagram showing a vehicle control system according to a first embodiment.

FIG. 1 is a block diagram showing a vehicle control system 100 according to a first embodiment. The vehicle control system 100 according to the first embodiment, mounted on a vehicle such as a passenger car, controls the traveling of a vehicle (host vehicle). The vehicle control system 100 controls the start of the host vehicle in response to the start of the preceding vehicle when the host vehicle and a preceding vehicle ahead of the host vehicle are stationary. The preceding vehicle refers to a vehicle that travels immediately before the host vehicle in the traveling lane in which the host vehicle travels. The preceding vehicle may be a four-wheeled vehicle or a two-wheeled vehicle.

[Configuration of the Vehicle Control System]

As shown in FIG. 1, the vehicle control system 100 includes an Electronic Control Unit [ECU] 10 that integrally manages the system. The ECU 10 is an electronic control unit having a Central Processing Unit [CPU], a Read Only Memory [ROM], a Random Access Memory [RAM], a Controller Area Network [CAN] communication circuit, and so on. The ECU 10 implements various functions, for example, by loading a program, stored in the ROM, into the RAM and then executing the program, loaded in the RAM, by the CPU. The ECU 10 may be configured by a plurality of electronic control units. The ECU 10 is connected to a radar sensor 1, a camera 2, a vehicle speed sensor 3, and an actuator 4.

The radar sensor 1 uses radio waves (for example, millimeter waves) or light to detect detection points around the host vehicle. The radar sensor sends radio waves or light to the surroundings of the host vehicle and detects the detection points by receiving radio waves or light reflected by an object. The radar sensor 1 sends the detection point information on the detected detection points to the ECU 10. The detection point information includes the relative position between the host vehicle and a detection point and the relative speed of a detection point with respect to the host vehicle.

The camera 2 is a capturing device for capturing the external situation of the host vehicle. The camera 2 is provided on the back side of the windshield of the host vehicle. The camera 2 sends the captured information on the external situation of the host vehicle to the ECU 10. A plurality of cameras 2 may be provided in the host vehicle. In addition, the camera 2 may be a monocular camera or a stereo camera. The information captured by the stereo camera also includes the information on the depth direction. A monocular camera can also acquire the information on the depth direction using a known method.

The vehicle speed sensor 3 is a detector that detects the speed of the host vehicle. An example of the vehicle speed sensor 3 is a wheel speed sensor that is provided on the wheels of the host vehicle, or on the drive shaft that rotates in synchronization with the wheels, to detect the rotation speed of the wheels. The vehicle speed sensor 3 sends the detected vehicle speed information (wheel speed information) to the ECU 10.

The actuator 4 is a device that controls the traveling of the host vehicle. The actuator 4 at least includes a throttle actuator, a brake actuator, and a steering actuator. The throttle actuator controls the amount of air to be supplied to the engine (throttle angle) in response to the control signal from the ECU 10 to control the driving force of the host vehicle. When the host vehicle is a hybrid vehicle, the control signal is input from the ECU 10 not only to the engine to control the amount of air to be supplied to the engine, but also to the motor that works as the power source, for controlling the driving force. When the host vehicle is an electric vehicle, the control signal is input from the ECU 10 to the motor that works as the power source for controlling the driving force. The motor used as the power source in these cases constitutes the actuator 4.

The brake actuator controls the brake system in response to the control signal from the ECU 10 to control the braking force to be applied to the wheels of the host vehicle. For example, a hydraulic brake system can be used as the brake system. The steering actuator controls the driving of the assist motor, which controls the steering torque in the electric power steering system, according to the control signal from the ECU 10. Thus, the steering actuator controls the steering torque of the host vehicle.

Next, the functional configuration of the ECU 10 will be described. The ECU 10 includes a vehicle speed recognition unit 11, a surrounding environment recognition unit 12, a stationary state determination unit 13, a preceding vehicle start determination unit 14, an adjacent vehicle determination unit 15, an adjacent vehicle start determination unit 16, and a vehicle control unit 17.

The vehicle speed recognition unit 11 recognizes the vehicle speed of the host vehicle based on the detection result of the vehicle speed sensor 3. The vehicle speed recognition unit 11 recognizes the vehicle speed of the host vehicle, for example, based on the wheel speed information.

The surrounding environment recognition unit 12 recognizes the surrounding environment of the host vehicle based on at least one of the detection point information sensed by the radar sensor 1 and the captured information captured by the camera 2. The surrounding environment recognition unit 12 groups the detection points around the host vehicle based on the detection point information sensed by the radar sensor 1 and, then, compares the previously prepared pattern data with the detection groups to recognize the objects around the host vehicle. The objects include other vehicles, bicycles, pedestrians, and structures such as guardrails. Alternatively, the surrounding environment recognition unit 12 uses the captured information, captured by the camera 2, to recognize the boundary of an object based on the difference in parameters, such as the luminance in a captured image, and then compares previously prepared image pattern data with the objects in the image to recognize the objects around the host vehicle.

The surrounding environment recognition unit 12 recognizes the surrounding environment such as the type of an object (whether or not the object is a vehicle) around the host vehicle, the position of the object, the speed of the object, and the moving direction of the object. The objects include the white lines constituting a lane. That is, the surrounding environment recognition unit 12 also recognizes the white lines around the host vehicle. Based on the result of white line recognition, the surrounding environment recognition unit 12 recognizes the traveling lane in which the host vehicle is traveling, as well as the adjacent lanes adjacent to the traveling lane, as the surrounding environment. The surrounding environment recognition unit 12 repeats the recognition of the surrounding environment at preset time intervals.

The stationary state determination unit 13 determines whether the host vehicle and the preceding vehicle ahead of the host vehicle are stationary, based on the vehicle speed of the host vehicle recognized by the vehicle speed recognition unit 11 and the surrounding environment recognized by the surrounding environment recognition unit 12. The stationary state refers to the state in which the vehicle is temporarily stopped but not to the parking state in which the engine is stopped.

It should be noted that the stationary state determination unit 13 determines that the host vehicle and the preceding vehicle are not stationary when at least one of the host vehicle and the preceding vehicle is not stationary. When there is no preceding vehicle, the stationary state determination unit 13 determines that the host vehicle and the preceding vehicle are not stationary.

The preceding vehicle start determination unit 14 determines, based on the surrounding environment, whether the preceding vehicle has started if it has been determined by the stationary state determination unit 13 that the host vehicle and the preceding vehicle are stationary. The preceding vehicle start determination unit 14 determines that the preceding vehicle has started if the speed of the preceding vehicle (the speed at which the preceding vehicle moves forward in the direction in which the host vehicle moves) exceeds the start determination threshold. The start determination threshold value is a threshold that is set in advance. The method for determining whether the preceding vehicle has started is not limited to the method using the start determination threshold.

The adjacent vehicle determination unit 15 determines, based on the surrounding environment, whether there is an adjacent vehicle if it is determined by the stationary state determination unit 13 that the host vehicle and the preceding vehicle are stationary. An adjacent vehicle refers to another vehicle that is in an adjacent lane and is stationary adjacent to the host vehicle (on the left or on the right). The adjacent vehicle determination unit 15 determines that there is no adjacent vehicle also when the host vehicle is traveling on a single-lane road and, therefore, there is no adjacent lane.

The adjacent vehicle start determination unit 16 determines whether the adjacent vehicle has started if it is determined by the adjacent vehicle determination unit 15 that there is an adjacent vehicle and if it is determined by the preceding vehicle start determination unit 14 that the preceding vehicle has started. The adjacent vehicle start determination unit 16 determines that the adjacent vehicle has started if the speed of the adjacent vehicle (the speed at which the adjacent vehicle moves forward in the direction in which the host vehicle moves) exceeds the start determination threshold. It should be noted that the start determination threshold of the preceding vehicle start determination unit 14 and the start determination threshold of the adjacent vehicle start determination unit 16 may be the same value or different values. The adjacent vehicle start determination unit 16 determines that the adjacent vehicle has started also when the adjacent vehicle has started before it is determined that the preceding vehicle has started.

The vehicle control unit 17 starts the host vehicle when the preceding vehicle has started if it is not determined by the adjacent vehicle determination unit 15 that there is an adjacent vehicle and if it is determined by the preceding vehicle start determination unit 14 that the preceding vehicle has started. The vehicle control unit 17 sends the control signal to the actuator 4 to start the host vehicle that is stationary.

On the other hand, if it is determined by the adjacent vehicle determination unit 15 that there is an adjacent vehicle, the vehicle control unit 17 does not start the host vehicle even if it is determined by the preceding vehicle start determination unit 14 that the preceding vehicle has started. In this case, the vehicle control unit 17 starts the host vehicle when it is determined by the adjacent vehicle start determination unit 16 that the adjacent vehicle has started. When there are adjacent vehicles on both the left and right of the host vehicle, the vehicle control unit 17 starts the host vehicle if it is determined that one of the adjacent vehicles has started. The vehicle control unit 17 may be configured to start the host vehicle if it is determined that both the left and right adjacent vehicles have started.

[Processing of the Vehicle Control System]
<Adjacent Vehicle Presence Determination Processing>

Figure 2:
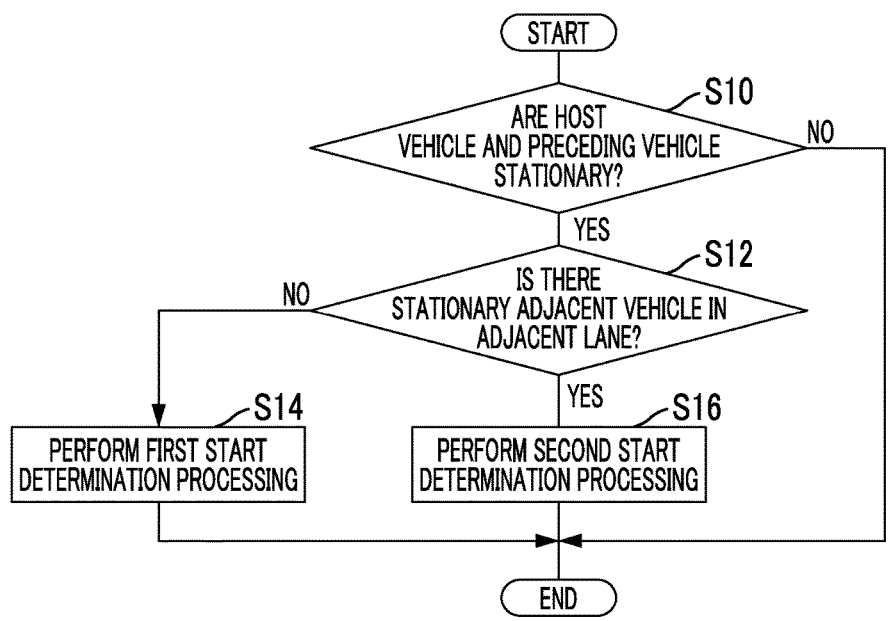
FIG. 2 is a flowchart showing adjacent vehicle presence determination processing.

Next, the processing of the vehicle control system 100 according to the first embodiment will be described. First, the adjacent vehicle presence determination processing will be described. FIG. 2 is a flowchart showing the adjacent vehicle presence determination processing. The flowchart shown in FIG. 2 is performed while the engine of the host vehicle is driven.

As shown in FIG. 2, in S10, the ECU 10 of the vehicle control system 100 uses the stationary state determination unit 13 to determine whether the host vehicle and the preceding vehicle are stationary. The stationary state determination unit 13 makes the above determination based on the vehicle speed of the host vehicle recognized by the vehicle speed recognition unit 11 and the surrounding environment recognized by the surrounding environment recognition unit 12. If it is not determined that the host vehicle and the preceding vehicle are stationary (S10: NO), the ECU 10 terminates the current processing. After that, the ECU 10 repeats the processing from S10 again after a predetermined time elapses. If it is determined that the host vehicle and the preceding vehicle are stationary (S10: YES), the processing of the ECU 10 proceeds to S12.

In S12, the ECU 10 uses the adjacent vehicle determination unit 15 to determine whether there is an adjacent vehicle. The adjacent vehicle determination unit 15 determines whether there is an adjacent vehicle based on the surrounding environment. If it is not determined that there is an adjacent vehicle (S12: NO), the processing of the ECU 10 proceeds to S14. If it is determined that there is an adjacent vehicle (S12: YES), the processing of the ECU 10 proceeds to S16.

In S14, the ECU 10 performs the first start determination processing. In S16, the ECU 10 performs the second start determination processing. The first start determination processing and the second start determination processing will be described below.

<First Start Determination Processing>

Figure 3A:
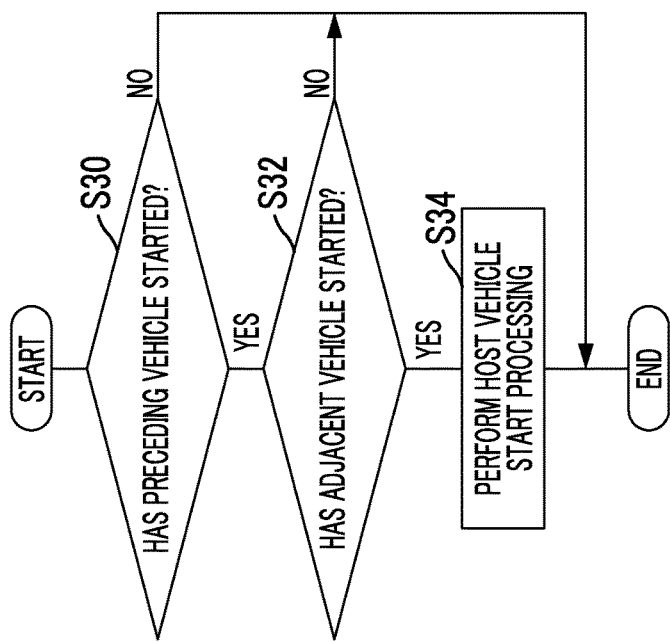
FIG. 3A is a flowchart showing first start determination processing.

Next, the first start determination processing will be described. FIG. 3A is a flowchart showing the first start determination processing.

As shown in FIG. 3A, in S20, the ECU 10 uses the preceding vehicle start determination unit 14 to determine whether the preceding vehicle has started. The preceding vehicle start determination unit 14 determines whether the preceding vehicle has started based on the surrounding environment. If it is not determined that the preceding vehicle has started (S20: NO), the ECU 10 terminates the current processing. After that, the ECU 10 repeats the processing from S20 again after a predetermined time elapses. If it is determined that the preceding vehicle has started (S20: YES), the processing of the ECU 10 proceeds to S22.

In S22, the ECU 10 uses the vehicle control unit 17 to start the host vehicle. The vehicle control unit 17 sends the control signal to the actuator 4 to start the host vehicle that is stationary. After that, the ECU 10 terminates the current processing and, after a predetermined time elapses, repeats the processing again from S10 in FIG. 2.

<Second Start Determination Processing>

Figure 3B:
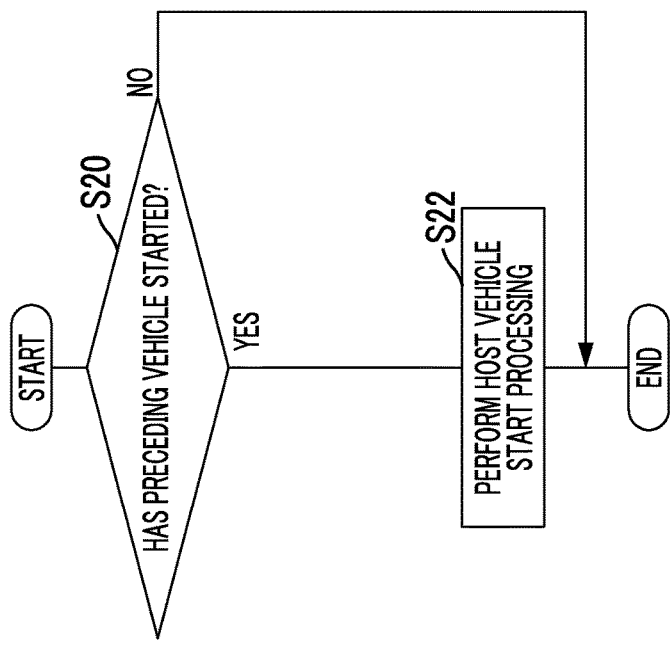
FIG. 3B is a flowchart showing second start determination processing.

Next, the second start determination processing will be described. FIG. 3B is a flowchart showing the second start determination processing.

As shown in FIG. 3B, in S30, the ECU 10 uses the preceding vehicle start determination unit 14 to determine whether the preceding vehicle has started. If it is not determined that the preceding vehicle has started (S30: NO), the ECU 10 terminates the current processing. After that, the ECU 10 repeats the determination processing in S30 again after a predetermined time elapses. If it is determined that the preceding vehicle has started (S30: YES), the processing of the ECU 10 proceeds to S32.

In S 32, the ECU 10 uses the adjacent vehicle start determination unit 16 to determine whether the adjacent vehicle has started. The adjacent vehicle start determination unit 16 determines whether the adjacent vehicle has started, based on the surrounding environment. If it is not determined that the adjacent vehicle has started (S32: NO), the ECU 10 suspends the start of the host vehicle and terminates the current processing. After that, the ECU 10 repeats the processing again from S30 after a predetermined time elapses. If it is determined that the adjacent vehicle has started (S32: YES), the processing of the ECU 10 proceeds to S34. It should be noted that the adjacent vehicle start determination unit 16 determines that the adjacent vehicle has started also when the adjacent vehicle has already started before determining the start of the preceding vehicle in S30.

In S34, the ECU 10 uses the vehicle control unit 17 to start the host vehicle. After that, the ECU 10 terminates the current processing and, after a predetermined time elapses, repeats the processing again from S10 in FIG. 2.

Effect of the Vehicle Control System in the First Embodiment

The vehicle control system 100 in the first embodiment described above has the following effect. If the host vehicle and the preceding vehicle are stationary and if there is a stationary adjacent vehicle, the vehicle control system 100 does not start the host vehicle until it is determined that the adjacent vehicle has started even if it is determined that the preceding vehicle has started. Therefore, even if it is erroneously determined, due to a slipping-by vehicle that slips by the host vehicle for moving ahead of the host vehicle, that the preceding vehicle has started, the vehicle control system 100 does not start the host vehicle until it is determined that the adjacent vehicle has started, thus preventing the stationary host vehicle from starting due to an erroneous determination.

Second Embodiment

Figure 4:
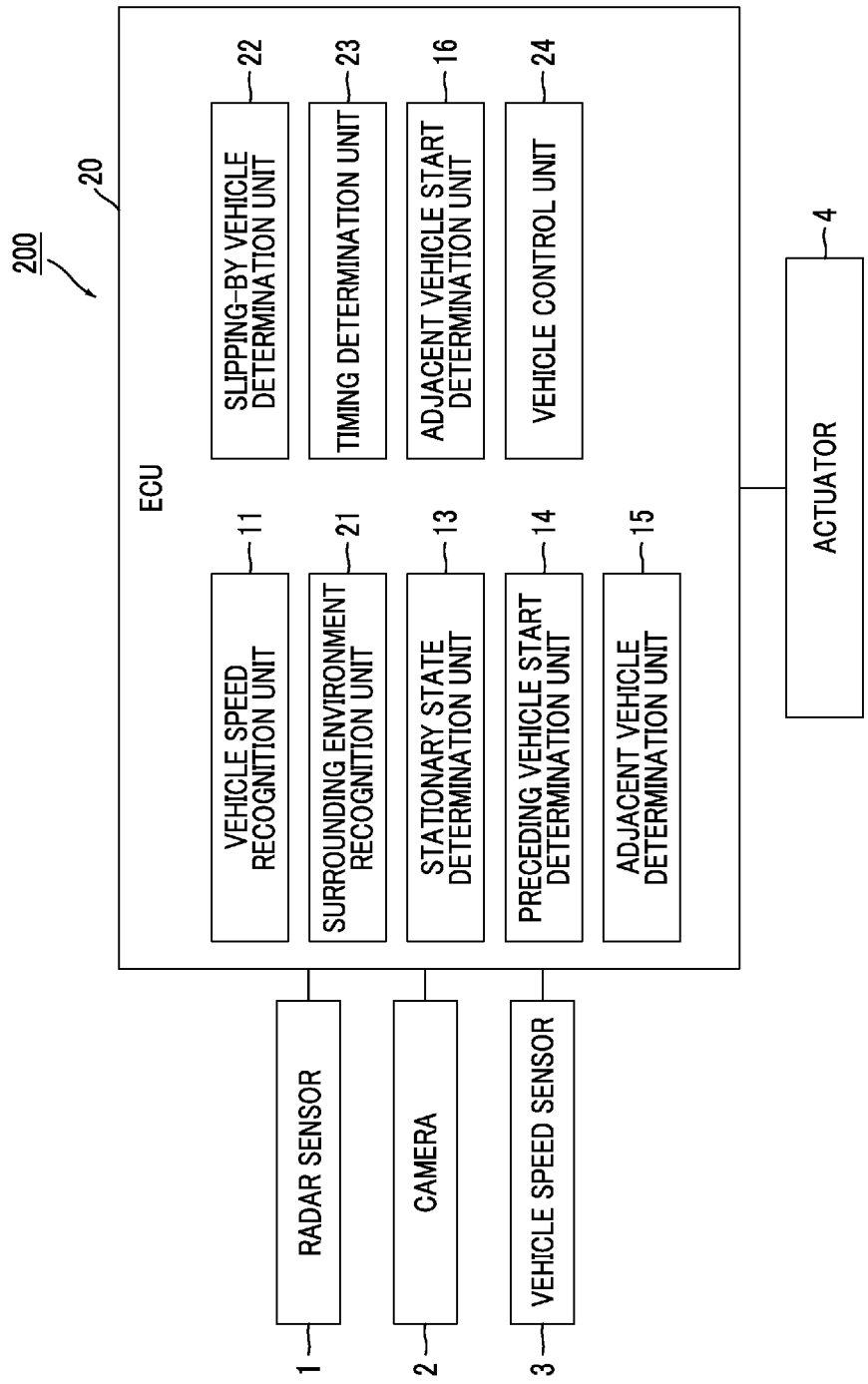
FIG. 4 is a block diagram showing a vehicle control system according to a second embodiment.

Next, a second embodiment will be described. FIG. 4 is a block diagram showing a vehicle control system 200 according to the second embodiment. An ECU 20 of the vehicle control system 200 shown in FIG. 4 is different from the ECU 10 in the first embodiment in that a slipping-by vehicle determination unit 22 and a timing determination unit 23 are added. In addition, a surrounding environment recognition unit 21 and a vehicle control unit 24 have functions different from those of the surrounding environment recognition unit 12 and the vehicle control unit 17 in the first embodiment. In FIG. 4, the same reference numeral is used for the same or equivalent component in the first embodiment and the duplicated description is not repeated.

[Configuration of the Vehicle Control System]

The slipping-by vehicle determination unit 22 and the timing determination unit 23 according to the second embodiment will be described below. The slipping-by vehicle determination unit 22 determines whether a slipping-by vehicle has been lost. The slipping-by vehicle refers to another vehicle that slips by the stationary host vehicle for moving ahead of the host vehicle. For example, the slipping-by vehicle is a two-wheeled vehicle that slips by the side of the stationary host vehicle from behind the host vehicle for moving ahead. The slipping-by vehicle also includes a two-wheeled vehicle that enters the road from a path extending to the side of the stationary host vehicle, turns to the forward direction on the side of the host vehicle, and approaches the preceding vehicle ahead of the host vehicle. The slipping-by vehicle may be a three-wheeled cycle or a four-wheeled vehicle.

A slipping-by vehicle lost condition means that a slipping-by vehicle has become unrecognizable (the slipping-by vehicle cannot be tracked) due to the movement of the slipping-by vehicle. A slipping-by vehicle lost condition occurs when the slipping-by vehicle becomes unable to be distinguished from other objects (when the slipping-by vehicle and other objects are erroneously recognized as one object). A slipping-by vehicle lost condition also occurs when the slipping-by vehicle moves out of the detection range of the radar sensor 1 and the capturing range of the camera 2.

The slipping-by vehicle determination unit 22 determines, based on the surrounding environment, whether a slipping-by vehicle has been lost if it is determined by the stationary state determination unit 13 that the host vehicle and the preceding vehicle are stationary and if it is determined by the adjacent vehicle determination unit 15 that there is an adjacent vehicle. The slipping-by vehicle determination unit 22 uses a known method to recognize and track (tracking) a slipping-by vehicle and then determines whether the tracked slipping-by vehicle has been lost.

The timing determination unit 23 determines whether the preceding vehicle starting timing indicates the slipping-by vehicle losing timing if it is determined by the slipping-by vehicle determination unit 22 that the slipping-by vehicle has been lost and if it is determined by the preceding vehicle start determination unit 14 that the preceding vehicle has started.

More specifically, if it is determined by the slipping-by vehicle determination unit 22 that the slipping-by vehicle has been lost, the timing determination unit 23 starts measuring the time that will elapse from the time the slipping-by vehicle has been lost. If it is determined that the preceding vehicle has started before the end time elapses, the timing determination unit 23 determines that the preceding vehicle starting timing indicates the slipping-by vehicle losing timing. The end time is a certain period of time that is set in advance.

Next, the surrounding environment recognition unit 21 and the vehicle control unit 24 according to the second embodiment will be described. First, the vehicle control unit 24 will be described. If it is not determined by the slipping-by vehicle determination unit 22 that the slipping-by vehicle has been lost, the vehicle control unit 24 starts the stationary host vehicle when the preceding vehicle starts. If it is determined that the slipping-by vehicle has been lost but if it is not determined by the timing determination unit 23 that the preceding vehicle starting timing indicates the slipping-by vehicle losing timing, the vehicle control unit 24 starts the stationary host vehicle when the preceding vehicle starts.

On the other hand, if it is determined by the slipping-by vehicle determination unit 22 that the slipping-by vehicle has been lost and if it is determined by the timing determination unit 23 that the preceding vehicle starting timing indicates the slipping-by vehicle losing timing, the vehicle control unit 24 does not start the host vehicle until it is determined by the adjacent vehicle start determination unit 16 that the adjacent vehicle has started.

The surrounding environment recognition unit 21 uses the predetermined standard recognition setting to recognize the surrounding environment. The standard recognition setting refers to the setting determined for use by the surrounding environment recognition unit 21 as the standard for recognizing the surrounding environment.

More specifically, the standard recognition setting uses the detection point information detected only in a part of the detection ranges, instead of the detection point information detected in all detection ranges of the radar sensor 1, for recognizing the surrounding environment. For example, even when the detection range of the radar sensor 1 covers the entire circumference around the host vehicle, the standard recognition setting excludes the detection ranges diagonally behind the left and right sides of the host vehicle from the setting, but uses only the detection point information on the other detection ranges, for recognizing the surrounding environment. By using the standard recognition setting, the calculation load and the calculation time of the ECU 20 can be reduced as compared with those required for recognizing the surrounding environment by using the detection point information on all detection ranges of the radar sensor 1. For the standard recognition setting, an algorithm in which calculation speed is prioritized over recognition accuracy may be used as the calculation algorithm for recognizing the surrounding environment. This allows the ECU 20 to reduce the calculation time in recognizing the surrounding environment.

When the host vehicle does not start because it is determined by the preceding vehicle start determination unit 14 that the preceding vehicle has started but it is not determined by the adjacent vehicle start determination unit 16 that the adjacent vehicle has started, the surrounding environment recognition unit 21 uses the high accuracy recognition setting to recognize the surrounding environment. The high accuracy recognition setting is a setting (predetermined setting) provided for use by the surrounding environment recognition unit 21 and having a higher surrounding environment recognition accuracy than that of the standard recognition setting.

More specifically, unlike the standard recognition setting, the high accuracy recognition setting uses the detection point information on all detection ranges of the radar sensor 1 for recognizing the surrounding environment. The high accuracy recognition setting, when used for recognizing the surrounding environment, allows the surrounding environment recognition unit 21 to use the detection point information that is not used in the standard recognition setting, thus improving the recognition accuracy of the surrounding environment. In addition, for the high accuracy recognition setting, an algorithm with higher recognition accuracy than that of the standard recognition setting may be used as the calculation algorithm for recognizing the surrounding environment. More specifically, when the convergence calculation is performed in the calculation algorithm in the high accuracy recognition setting, the termination condition of the convergence operation may be more stringent than for the standard recognition setting (that is, a condition ensuring higher calculation accuracy even if the calculation time becomes longer).

Although the radar sensor 1 has been used in the above description, the same applies also when the camera 2 is used instead of the radar sensor 1. That is, the standard recognition setting may use only the captured information on some captured ranges, instead of the captured information on all ranges, captured by the camera 2 for recognizing the surrounding environment. In this case, the high accuracy recognition setting can use the captured information on all ranges, captured by the camera 2, for recognizing the surrounding environment.

[Control of the Vehicle Control System]

Next, the control of the vehicle control system 200 according to the second embodiment will be described. Since the adjacent vehicle presence determination processing shown in FIG. 2 and the first start determination processing shown in FIG. 3A are the same as those in the first embodiment, their description will be omitted.

Figure 5:
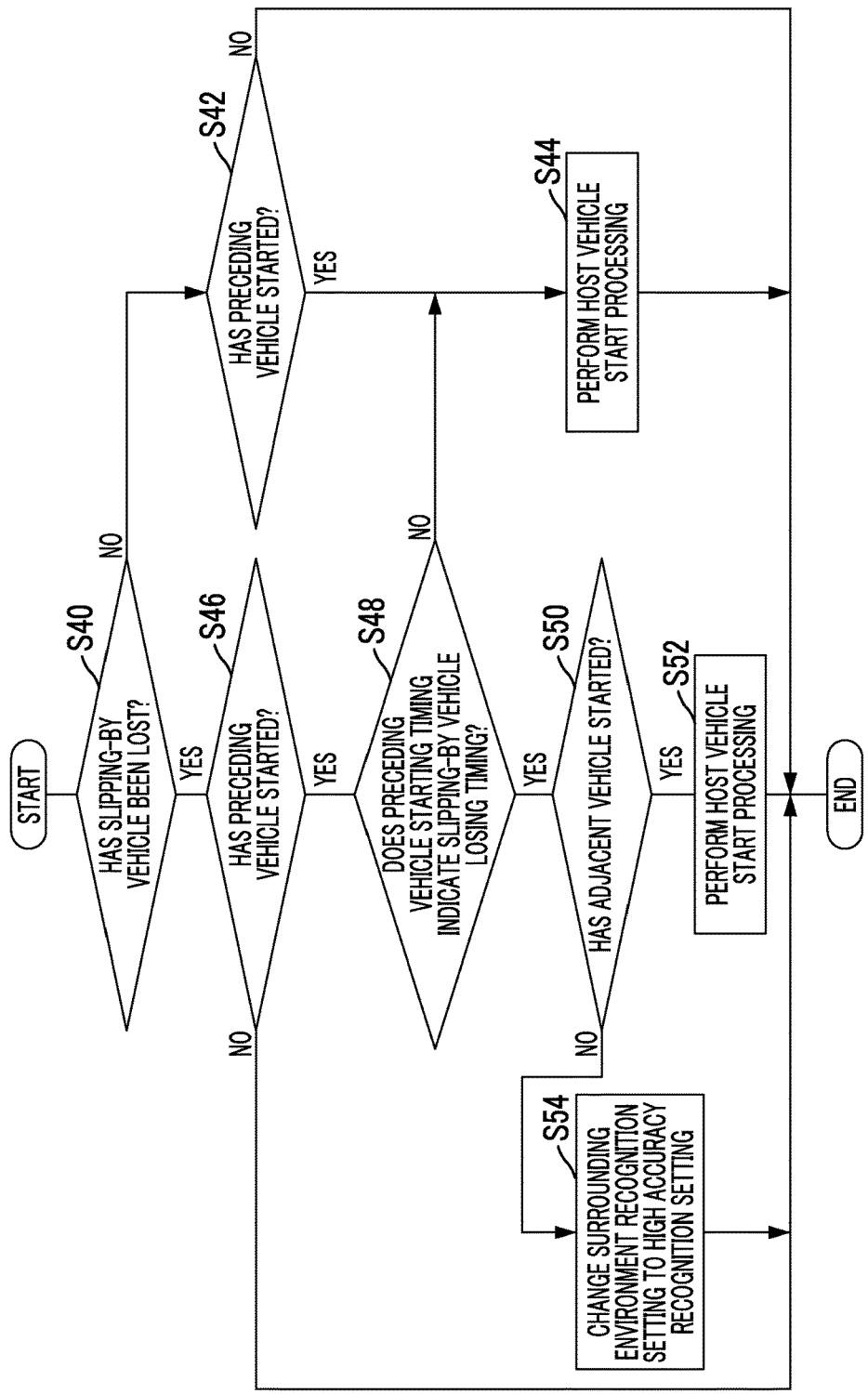
FIG. 5 is a flowchart showing second start determination processing in the second embodiment.

FIG. 5 is a flowchart showing the second start determination processing in the second embodiment. The flowchart shown in FIG. 5 is performed as the second start determination processing after it is determined that there is an adjacent vehicle in the flowchart shown in FIG. 2.

As shown in FIG. 5, in S40, the ECU 20 of the vehicle control system 200 according to the second embodiment determines whether it is determined by the slipping-by vehicle determination unit 22 that a slipping-by vehicle has been lost. The slipping-by vehicle determination unit 22 determines whether the slipping-by vehicle has been lost based on the surrounding environment. If it is not determined that the slipping-by vehicle has been lost (S40: NO), the processing of the ECU 20 proceeds to S42. If it is determined that the slipping-by vehicle has been lost (S40: YES), the processing of the ECU 20 proceeds to S46.

In S42, the ECU 20 uses the preceding vehicle start determination unit 14 to determine whether the preceding vehicle has started. If it is not determined that the preceding vehicle has started (S42: NO), the ECU 20 terminates the current processing. After that, the ECU 20 repeats the determination processing in S40 again after a predetermined time elapses. If it is determined that the preceding vehicle has started (S42: YES), the processing of the ECU 20 proceeds to S44.

In S44, the ECU 20 uses the vehicle control unit 24 to start the host vehicle. The vehicle control unit 24 sends the control signal to the actuator 4 to start the stationary host vehicle. After that, the ECU 20 terminates the current processing and, after a predetermined time elapses, repeats the processing again from S10 in FIG. 2.

In S46, the ECU 20 uses the preceding vehicle start determination unit 14 to determine whether the preceding vehicle has started. If it is not determined that the preceding vehicle has started (S46: NO), the ECU 20 terminates the current processing. After that, the ECU 20 repeats the determination processing in S40 again after a predetermined time elapses. If it is determined that the preceding vehicle has started (S46: YES), the processing of the ECU 20 proceeds to S48.

In S48, the ECU 20 uses the timing determination unit 23 to determine whether the preceding vehicle starting timing indicates the slipping-by vehicle losing timing. If it is determined by the slipping-by vehicle determination unit 22 that the slipping-by vehicle has been lost, the timing determination unit 23 starts measuring the time from the time the slipping-by vehicle has been lost and, if it is determined that the preceding vehicle has started before the end time elapses, determines that the preceding vehicle starting timing indicates the slipping-by vehicle losing timing.

If it is determined that the preceding vehicle starting timing indicates the slipping-by vehicle losing timing (S48: YES), the processing of the ECU 20 proceeds to S50. If it is not determined that the preceding vehicle starting timing indicates the slipping-by vehicle losing timing (S48: NO), the processing of the ECU 20 proceeds to S44 described above.

In S50, the ECU 20 uses the adjacent vehicle start determination unit 16 to determine whether the adjacent vehicle has started. The adjacent vehicle start determination unit 16 determines whether the adjacent vehicle has started based on the surrounding environment. If it is determined that the adjacent vehicle has started (S50: YES), the processing of the ECU 20 proceeds to S52. If it is not determined that the adjacent vehicle has started (S50: NO), the processing of the ECU 20 proceeds to S54.

In S52, the ECU 20 uses the vehicle control unit 24 to start the host vehicle. After that, the ECU 20 terminates the current processing and, after a predetermined time elapses, repeats the processing again from S10 in FIG. 2.

In S54, the ECU 20 changes the setting, which is used for recognizing the surrounding environment in the surrounding environment recognition unit 21, from the standard recognition setting to the high accuracy recognition setting. The surrounding environment recognition unit 21 recognizes the surrounding environment using the high accuracy recognition setting until the host vehicle starts. After that, the ECU 20 suspends the start of the host vehicle, terminates the current processing and, after a predetermined time elapses, repeats the processing again from S40.

Effect of the Vehicle Control System in the Second Embodiment

The vehicle control system 200 in the second embodiment described above has the following effect. If it is determined that the preceding vehicle has started when the host vehicle and the preceding vehicle are stationary but if the preceding vehicle starting timing indicates the slipping-by vehicle losing timing, the possibility increases that the start of the preceding vehicle is erroneously determined. Considering this possibility, the vehicle control system 200 does not start the host vehicle until it is determined that the stationary adjacent vehicle has started. Therefore, this vehicle control system makes it possible to prevent the stationary host vehicle from starting if it is erroneously determined, due to a slipping-by vehicle, that the preceding vehicle has started.

In addition, in the vehicle control system 200, if it is determined that the preceding vehicle has started but if the start of the host vehicle is suspended because it is not determined that the adjacent vehicle has started, the high accuracy recognition setting, which is higher in recognition accuracy than the standard recognition setting, is used for recognizing the surrounding environment. The use of the high accuracy recognition setting prevents a condition in which the host vehicle cannot start because the start of the adjacent vehicle cannot be determined due to an insufficient recognition accuracy.

More specifically, when the standard recognition setting is used, the surrounding environment recognition unit 21 cannot recognize a long adjacent vehicle, such as a bus, to its rear end. On the other hand, when the high accuracy recognition setting is used, the surrounding environment recognition unit 21 can recognize a long adjacent vehicle to its rear end, making it possible to recognize the surrounding environment with high accuracy. As a result, the adjacent vehicle start determination unit 16, which cannot determine that the adjacent vehicle has started based on the surrounding environment indicated by the standard recognition setting, can recognize the movement of the rear end of the adjacent vehicle based on the surrounding environment indicated by the high accuracy recognition setting, thereby accurately determining that the adjacent car has started.

Third Embodiment

Figure 6:
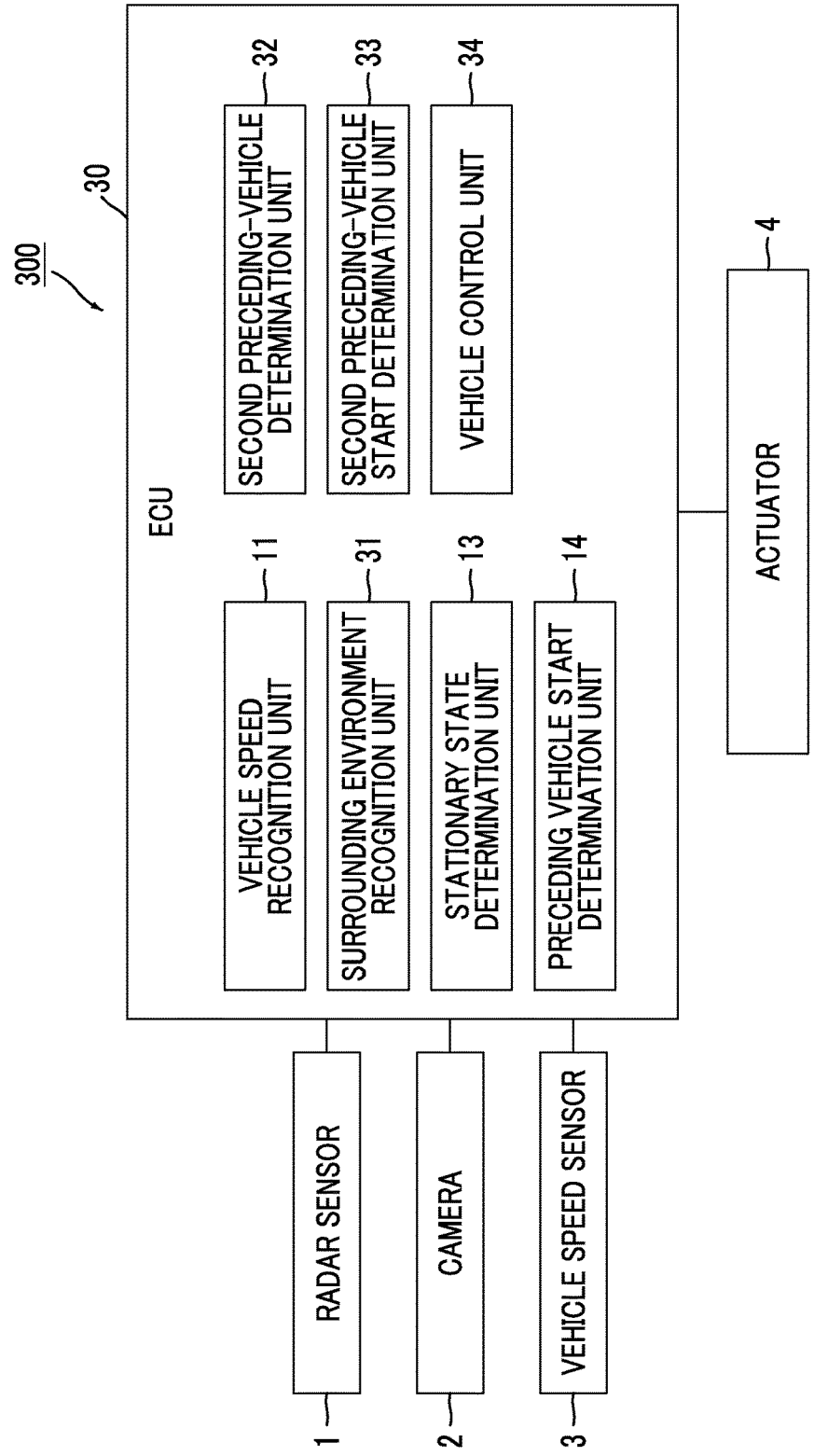
FIG. 6 is a block diagram showing a vehicle control system according to a third embodiment.

Next, a third embodiment will be described. FIG. 6 is a block diagram showing a vehicle control system 300 according to the third embodiment. The vehicle control system 300 shown in FIG. 6 determines whether to start the host vehicle based, not on whether an adjacent vehicle has started, but on whether a second preceding vehicle has started. That is, the ECU 30 of the vehicle control system 300 has a second preceding-vehicle determination unit 32 and a second preceding-vehicle start determination unit 33 in place of the adjacent vehicle determination unit 15 and the adjacent vehicle start determination unit 16 in the first embodiment. In addition, a surrounding environment recognition unit 31 and a vehicle control unit 34 of the vehicle control system 300 have functions different from those of the corresponding units in the first embodiment. In FIG. 6, the same reference numerals are given to the same or corresponding parts as in the first embodiment, and redundant explanations are omitted.

[Configuration of the Vehicle Control System]

The second preceding-vehicle determination unit 32 in the third embodiment determines whether there is a second preceding vehicle based on the surrounding environment if it is determined by the stationary state determination unit 13 that the host vehicle and the preceding vehicle are stationary. The second preceding vehicle refers to another vehicle that remains stationary ahead of the preceding vehicle in the traveling lane in which the host vehicle travels. The second preceding-vehicle determination unit 32 may determine that there is no second preceding vehicle when the inter-vehicle distance between the preceding vehicle and another vehicle that is stationary ahead of the preceding vehicle is equal to or greater than a predetermined distance (for example, 5 m).

The second preceding-vehicle start determination unit 33 in the third embodiment determines whether the second preceding vehicle has started if it is determined by the second preceding-vehicle determination unit 32 that there is a second preceding vehicle and if it is determined by the preceding vehicle start determination unit 14 that the preceding vehicle has started. If the speed of the second preceding vehicle exceeds the start determination threshold, the second preceding-vehicle start determination unit 33 determines that the second preceding vehicle has started. It should be noted that the start determination threshold of the preceding vehicle start determination unit 14 and the start determination threshold of the second preceding-vehicle start determination unit 33 may be the same value or different values. The second preceding-vehicle start determination unit 33 determines that the second preceding vehicle has started also when the second preceding vehicle has started before it is determined that the preceding vehicle has started.

Next, the surrounding environment recognition unit 31 and the vehicle control unit 34 in the third embodiment will be described. First, the vehicle control unit 34 will be described. The vehicle control unit 34 starts the host vehicle when the preceding vehicle starts if it is not determined by the second preceding-vehicle determination unit 32 that there is a second preceding vehicle and if it is determined by the preceding vehicle start determination unit 14 that the preceding vehicle has started. The vehicle control unit 34 sends the control signal to the actuator 4 to start the stationary host vehicle.

If it is determined by the second preceding-vehicle determination unit 32 that there is a second preceding vehicle, the vehicle control unit 34 does not start the host vehicle even if it is determined by the preceding vehicle start determination unit 14 that the preceding vehicle has started. In this case, the vehicle control unit 34 starts the host vehicle if it is determined by the second preceding-vehicle start determination unit 33 that the second preceding vehicle has started.

The surrounding environment recognition unit 31 uses a known technology to recognize the surrounding environment including the second preceding vehicle. The surrounding environment recognition unit 31 may also recognize the second preceding vehicle using the radar sensor 1 or the camera 2 provided in the upper part of the host vehicle (above the front window, on the roof). In addition, the surrounding environment recognition unit 31 may recognize the second preceding vehicle using a road surface reflection sensed by the surface by the radar sensor 1.

Like the surrounding environment recognition unit 21 in the second embodiment, the surrounding environment recognition unit 31 recognizes the surrounding environment using the predetermined standard recognition setting. If it is determined by the preceding vehicle start determination unit 14 that the preceding vehicle has started but if the host vehicle does not start because it is not determined by the second preceding-vehicle start determination unit 33 that the second preceding vehicle has started, the surrounding environment recognition unit 31 recognizes the surrounding environment using the high accuracy recognition setting that is higher in surrounding environment recognition accuracy than the standard recognition setting. The standard recognition setting and the high accuracy recognition setting are the same as those in the second embodiment.

[Processing of the Vehicle Control System]
<Adjacent Vehicle Presence Determination Processing>

Figure 7A:
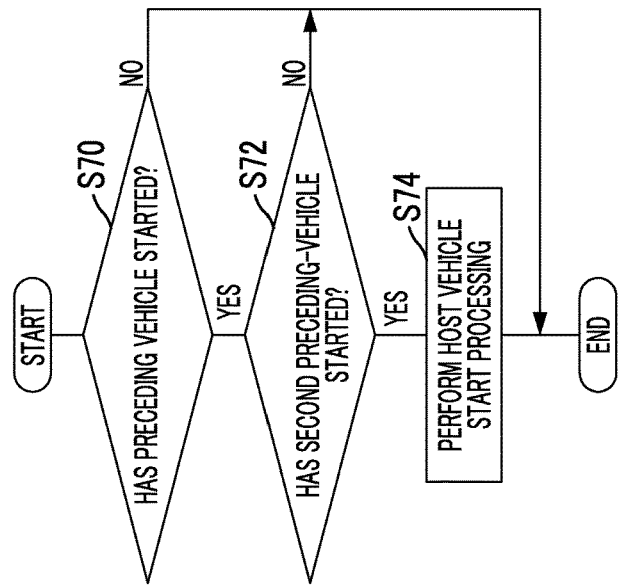
FIG. 7A is a flowchart showing second preceding-vehicle presence determination processing.

Next, the processing of the vehicle control system 300 according to the third embodiment will be described. First, the adjacent vehicle presence determination processing will be described. FIG. 7A is a flowchart showing the adjacent vehicle presence determination processing. The flowchart shown in FIG. 7A is performed while the engine of the host vehicle is driven.

As shown in FIG. 7A, in S60, the ECU 30 of the vehicle control system 300 uses the stationary state determination unit 13 to determine whether the host vehicle and the preceding vehicle are stationary. If it is not determined that the host vehicle and the preceding vehicle are stationary (S60: NO), the ECU 30 terminates the current processing. After that, the ECU 30 repeats the processing again from S60 after a predetermined time elapses. If it is determined that the host vehicle and the preceding vehicle are stationary (S60: YES), the processing of the ECU 30 proceeds to S62.

In S62, the ECU 30 uses the second preceding-vehicle determination unit 32 to determine whether there is a second preceding vehicle. If it is not determined that there is a second preceding vehicle (S62: NO), the processing of the ECU 30 proceeds to S64. If it is determined that there is a second preceding vehicle (S62: YES), the processing of the ECU 30 proceeds to S66.

In S64, the ECU 30 performs the first start determination processing. In S66, the ECU 30 performs the second start determination processing. Since the first start determination processing is the same as that of the first embodiment shown in FIG. 3A, its description will be omitted.

<Second Start Determination Processing>

Figure 7B:
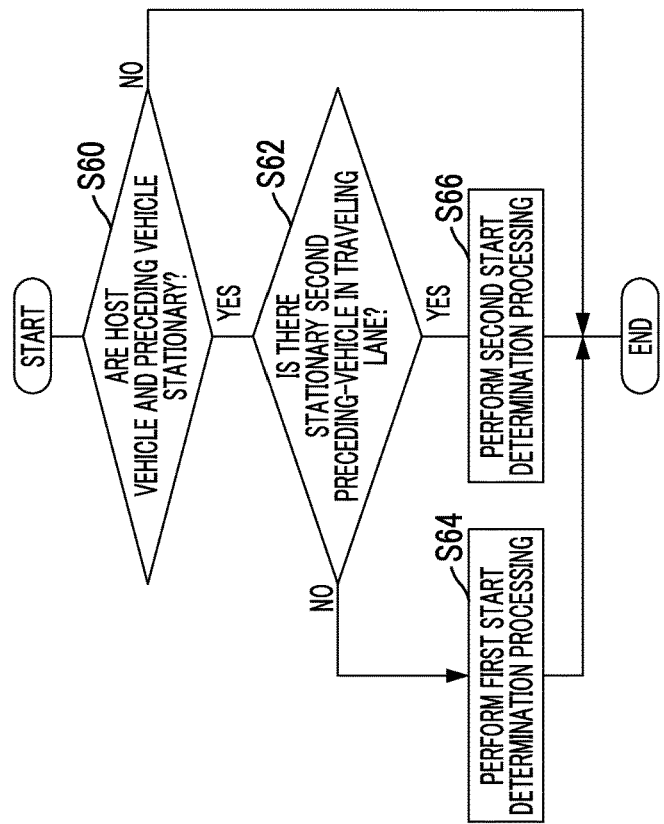
FIG. 7B is a flowchart showing second start determination processing.

The second start determination processing in the vehicle control system 300 according to the third embodiment will be described below. FIG. 7B is a flowchart showing the second start determination processing.

As shown in FIG. 7B, in S70, the ECU 30 uses the preceding vehicle start determination unit 14 to determine whether the preceding vehicle has started. The preceding vehicle start determination unit 14 determines whether the preceding vehicle has started based on the surrounding environment. If it is not determined that the preceding vehicle has started (S70: NO), the ECU 30 terminates the current processing. After that, the ECU 30 repeats the determination processing in S70 again after a predetermined time elapses. If it is determined that the preceding vehicle has started (S70: YES), the processing of the ECU 30 proceeds to S72.

In S72, the ECU 30 uses the second preceding-vehicle start determination unit 33 to determine whether the second preceding vehicle has started. The second preceding-vehicle start determination unit 33 determines whether the second preceding vehicle has started based on the surrounding environment. If it is not determined that the second preceding vehicle has started (S72: NO), the ECU 30 suspends the start of the host vehicle and terminates the current processing. At this time, the ECU 30 changes the recognition setting of the surrounding environment, used by the surrounding environment recognition unit 31, from the standard recognition setting to the high accuracy recognition setting. After that, the ECU 30 repeats the processing again from S70 after a predetermined time elapses.

If it is determined that the second preceding vehicle has started (S72: YES), the processing of the ECU 30 proceeds to S74. The second preceding-vehicle start determination unit 33 determines that the second preceding vehicle has started also when the second preceding vehicle has already started before determining, in S70, whether the preceding vehicle has started.

In S74, the ECU 30 uses the vehicle control unit 34 to start the host vehicle. After that, the ECU 30 terminates the current processing and, after a predetermined time elapses, repeats the processing again from S60 in FIG. 7A.

Effect of the Vehicle Control System in the Third Embodiment

The vehicle control system 300 in the third embodiment described above has the following effect. If it is determined that the preceding vehicle has started when the host vehicle and the preceding vehicle are stationary but if there is a stationary second preceding vehicle, the vehicle control system 300 does not start host vehicle until it is determined that the second preceding vehicle has started. Therefore, even if it is erroneously determined, due to a slipping-by vehicle that slips by the host vehicle for moving ahead of the host vehicle, that the preceding vehicle has started, the vehicle control system 300 does not start the host vehicle until it is determined that the second preceding vehicle has started, thus preventing the stationary host vehicle from starting due to an erroneous determination. In addition, unlike the vehicle control system 100 in the first embodiment, even when there is no adjacent lane that is adjacent to the traveling lane of the host vehicle, the vehicle control system 300 can determine whether the second preceding vehicle has started, thus preventing the stationary host vehicle from starting if it is erroneously determined, due to a slipping-by vehicle, that the preceding vehicle has started.

If it is determined that the preceding vehicle has started but if the start of the host vehicle is suspended because it is not determined that the second preceding has started, the vehicle control system 300 uses the high accuracy recognition setting, which is higher in recognition accuracy than the standard recognition setting, for recognizing the surrounding environment. The use of the high accuracy recognition setting prevents a condition in which the host vehicle cannot start because the start of the second preceding vehicle cannot be determined due to an insufficient recognition accuracy.

Although preferred embodiments of the present disclosure have been described above, the present disclosure is not limited to the above-described embodiments. The present disclosure can be implemented not only in the above-described embodiments but also in various forms including various modifications and improvements based on the knowledge of those skilled in the art.

Although both the radar sensor 1 and the camera 2 are used in the vehicle control systems 100-300 in the embodiments described above, only one of the radar sensor 1 and the camera 2 may be used.

The surrounding environment recognition unit 21 may recognize the surrounding environment not only by the method described in the above embodiments but also by a known method based on at least one of the detection point information sensed by the radar sensor 1 and the captured information captured by the camera 2. When both the radar sensor 1 and the camera 2 are used, the surrounding environment recognition unit 21 may combine the detection point information sensed by the radar sensor 1 and the captured information captured by the camera 2 to recognize the surrounding environment. The surrounding environment recognition unit 21 may recognize the surrounding environment using the so-called sensor fusion.

In the vehicle control system 100 according to the first embodiment, the recognition setting of the surrounding environment may be changed as in the surrounding environment recognition unit 21 of the second embodiment. That is, the vehicle control system 100 may include the surrounding environment recognition unit 21 in the second embodiment. In this case, if the result of S32 of the second start determination processing, shown in FIG. 3B, is NO in the vehicle control system 100, the processing for changing the recognition setting of the surrounding environment to the high accuracy recognition setting may be performed as in S54 in FIG. 5. On the other hand, the setting of the recognition accuracy of the surrounding environment need not necessarily be changed in the vehicle control system 200 of the second embodiment. The ECU 20 of the vehicle control system 200 may have the surrounding environment recognition unit 12 of the first embodiment in place of the surrounding environment recognition unit 21.

In addition, the vehicle control systems 100-300 may determine the presence of an adjacent vehicle based on the map information and the host vehicle's position on the map. By accurately recognizing an adjacent lane based on the map information and the host vehicle's position on the map, the adjacent vehicle determination unit 15 can reduce the possibility that another vehicle that is stationary on a road shoulder is erroneously determined as an adjacent vehicle.

In addition, if it is determined, based on the map information and the host vehicle's position on the map, that an adjacent lane is a dedicated lane (for example, a left-turn lane or a right-turn lane before an intersection) that is used according to a rule different from that of a traveling lane, the adjacent vehicle determination unit 15 may determine that there is no adjacent vehicle even if another vehicle is stationary in that adjacent lane.

More specifically, consider a road with three lanes in each direction composed, from left to right, the left-turn lane L1, the first through lane L2, and the second through lane L3. On the right of the second through lane L3, there is an oncoming vehicle lane L4 in which an oncoming vehicle travels straight. In this case, the timing of the green light of the traffic light in the left-turn lane L1 is different from the timing of the green light of the traffic light in the first through lane L2 and the second through lane L3. The information on the timing of the green light is also included in the map information.

In this case, when the traveling lane of the host vehicle is the left-turn lane L1, the adjacent vehicle determination unit 15 determines that there is no adjacent vehicle even if another vehicle is stationary in the adjacent first through lane L2. When the traveling lane of the host vehicle is the first through lane L2, the adjacent vehicle determination unit 15 determines that there is no adjacent vehicle even if another vehicle is stationary in the adjacent left-turn lane L1. On the other hand, when the traveling lane of the host vehicle is the first through lane L2, the adjacent vehicle determination unit 15 determines that there is an adjacent vehicle if another vehicle is stationary in the adjacent second through lane L3.

Similarly, when the traveling lane of the host vehicle is the second through lane L3, the adjacent vehicle determination unit 15 determines that there is an adjacent vehicle if another vehicle is stationary in the adjacent first through lane L2. On the other hand, when the traveling lane of the host vehicle is the second through lane L3, the adjacent vehicle determination unit 15 determines that there is no adjacent vehicle even if another vehicle (oncoming vehicle) is stationary in the adjacent oncoming vehicle lane L4.

The adjacent vehicle determination unit 15 uses a known method to recognize whether the adjacent lane is a left-turn lane L1, first through lane L2, second through lane L3, or oncoming vehicle lane L4 based on the map information and the host vehicle's position on the map. When the timing of the green light of the traffic light in the left-turn lane L1 matches the timing of the green light of the traffic light in the first through lane L2 and the second through lane L3 and when the traveling lane of the host vehicle is the left-turn lane L1, the adjacent vehicle determination unit 15 may determine that there is an adjacent vehicle if another vehicle is stationary in the adjacent first through lane L2. The information on the timing of the green light of the traffic light is not necessarily included in the map information. The adjacent vehicle determination unit 15 may acquire the information on the timing of the green light of traffic lights ahead of the host vehicle in each lane, using the road-to-vehicle communication or other methods.

In addition, when the state of the traffic lights ahead of the host vehicle can be recognized by the captured information captured by the camera 2 or via the radio communication of the traffic information network, the vehicle control systems 100-300 may determine whether to start the host vehicle considering the state of the traffic lights.

The timing determination unit 23 in the second embodiment may store the slipping-by vehicle losing time and, if the difference between the preceding vehicle starting time and the slipping-by vehicle losing time is less than the time threshold, determine that the preceding vehicle starting timing indicates the slipping-by vehicle losing timing. The time threshold is a value that is set in advance.

The standard recognition setting and the high accuracy recognition setting, used by the surrounding environment recognition unit 21 of the second embodiment, are not limited to the contents described in the second embodiment. It is only required that the high accuracy recognition setting is higher than the standard recognition setting in the surrounding environment recognition accuracy. When using the standard recognition setting, the surrounding environment may be recognized based only on the detection point information sensed by the radar sensor 1; when using the high accuracy recognition setting, both the detection point information sensed by the radar sensor 1 and the captured information captured by the camera 2 may be combined for recognizing the surrounding environment.

One possible modification is that, in the vehicle control system 200 according to the second embodiment, a second preceding vehicle of the third embodiment is used instead of an adjacent vehicle. The vehicle control system according to the modification is different from that in the second embodiment in that the second preceding-vehicle determination unit 32 and the second preceding-vehicle start determination unit 33 are included instead of the adjacent vehicle determination unit 15 and the adjacent vehicle start determination unit 16.

If it is not determined by the slipping-by vehicle determination unit 22 that the slipping-by vehicle has been lost, the vehicle control unit 24 of the vehicle control system according to the modification starts the stationary host vehicle when the preceding vehicle starts. In addition, if it is determined that the slipping-by vehicle has been lost but if it is not determined by the timing determination unit 23 that the preceding vehicle starting timing indicates slipping-by vehicle losing timing, the vehicle control unit 24 starts the stationary host vehicle when the stationary preceding vehicle starts. The processing of the vehicle control unit 24 described above is the same as that in the second embodiment.

On the other hand, it is determined by the slipping-by vehicle determination unit 22 that the slipping-by vehicle has been lost and if it is determined by the timing determination unit 23 that the preceding vehicle starting timing indicates the slipping-by vehicle losing timing, the vehicle control unit 24 does not start the host vehicle until it is determined by the second preceding-vehicle start determination unit 33 that the second preceding vehicle has started. In contrast, if it is determined by the slipping-by vehicle determination unit 22 that the slipping-by vehicle has been lost and if it is determined by the timing determination unit 23 that the preceding vehicle starting timing indicates the slipping-by vehicle losing timing, the vehicle control unit 24 starts the host vehicle if it is determined by the second preceding-vehicle start determination unit 33 that the second preceding vehicle has started.

The vehicle control system according to the modification has the following effect. If it is determined that the preceding vehicle has started when the host vehicle and the preceding vehicle are stationary but if the preceding vehicle starting timing indicates the slipping-by vehicle losing timing, the possibility increases that the start of the preceding vehicle is erroneously determined. Considering this possibility, the vehicle control system does not start the host vehicle until it is determined that the stationary second preceding vehicle has started. Therefore, the vehicle control system according to the modification makes it possible to prevent the stationary host vehicle from starting if it is erroneously determined, due to a slipping-by vehicle, that the preceding vehicle has started.

In the vehicle control system according to the modification, if the host vehicle does not start because it is not determined by the second preceding-vehicle start determination unit 33 that the second preceding vehicle has started, the setting of the recognition accuracy of the surrounding environment need not necessarily be changed as in the second embodiment. The ECU of the vehicle control system according to the modification may include the surrounding environment recognition unit 21 of the second embodiment or may include the surrounding environment recognition unit 12 of the first embodiment.

What is claimed is:

1. A vehicle control system comprising:
   an actuator; and
   an electronic control unit configured to
      recognize a vehicle speed of a host vehicle,
      recognize a surrounding environment of the host vehicle,
      determine, based on the vehicle speed of the host vehicle and the surrounding environment, whether the host vehicle and a preceding vehicle ahead of the host vehicle are stationary,
      determine, based on the surrounding environment, whether the preceding vehicle has started in a case where it is determined that the host vehicle and the preceding vehicle are stationary,
      determine, when it is determined that the host vehicle and the preceding vehicle are stationary, whether one of conditions is satisfied, the conditions including (i) a first condition for determining, based on the surrounding environment, that an adjacent vehicle has started, the adjacent vehicle being another vehicle stationary adjacent to the host vehicle in an adjacent lane adjacent to a traveling lane in which the host vehicle travels, (ii) a second condition for determining, based on the surrounding environment, that a first timing does not indicate a second timing, the first timing being a timing at which the preceding vehicle has started, the second timing being a timing at which a slipping-by vehicle has been lost, the slipping-by vehicle being a vehicle that slips by the host vehicle for moving ahead of the host vehicle, and (iii) a third condition for determining, based on the surrounding environment, that a second preceding vehicle has started, the second preceding vehicle being another vehicle stationary ahead of the preceding vehicle in the traveling lane, and
      start the host vehicle by using the actuator when at least one of the first condition, second condition, and third condition is satisfied.

2. The vehicle control system according to claim 1, wherein
   the electronic control unit is configured to
      determine, when it is determined that the host vehicle and the preceding vehicle are stationary, whether there is the adjacent vehicle based on the surrounding environment, and
      determine, based on the surrounding environment, whether the adjacent vehicle has started when it is determined that there is the adjacent vehicle and it is determined that the preceding vehicle has started, and
   the electronic control unit is configured
      to start the host vehicle by using the actuator when it is determined that there is the adjacent vehicle and it is determined that the adjacent vehicle has started, and
      not to start the host vehicle when it is determined that there is the adjacent vehicle and it is not determined that the adjacent vehicle has started.

3. The vehicle control system according to claim 1, wherein
the electronic control unit is configured to
determine, when it is determined that the host vehicle and the preceding vehicle are stationary, whether there is the adjacent vehicle based on the surrounding environment,
determine, when it is determined that there is the adjacent vehicle and it is determined that the preceding vehicle has started, whether the adjacent vehicle has started based on the second surrounding environment,
determine, when it is determined that there is the adjacent vehicle, whether the slipping-by vehicle has been lost based on the surrounding environment, and
determine whether the first timing indicates the second timing when it is determined that the slipping-by vehicle has been lost and it is determined that the preceding vehicle has started, and
the electronic control unit is configured
to start the host vehicle by using the actuator when it is determined that the preceding vehicle has started and it is not determined that the first timing indicates the second timing, and
not to start the host vehicle until it is determined that the adjacent vehicle has started, when the preceding vehicle has started and it is determined that the first timing indicates the second timing.

4. The vehicle control system according to claim 2, wherein
the electronic control unit is configured to
recognize the surrounding environment, by using a predetermined standard recognition setting, and
recognize the surrounding environment by using a high accuracy recognition setting higher in recognition accuracy than the standard recognition setting, when the host vehicle does not start based on a condition that it is not determined that the adjacent vehicle has started.

5. The vehicle control system according to claim 1, wherein
the electronic control unit is configured to
determine, when it is determined that the host vehicle and the preceding vehicle are stationary, whether there is the second preceding vehicle based on the surrounding environment, and
determine, when it is determined that there is the second preceding vehicle and it is determined that the preceding vehicle has started, whether the second preceding vehicle has started based on the surrounding environment, and
the electronic control unit is configured
to start the host vehicle by using the actuator when it is determined that there is the second preceding vehicle and it is determined that the second preceding vehicle has started, and
not to start the host vehicle when it is determined that there is the second preceding vehicle and it is not determined that the second preceding vehicle has started.

6. The vehicle control system according to claim 5, wherein
the electronic control unit is configured to
recognize the surrounding environment, by using a predetermined standard recognition setting, and
recognize the surrounding environment, by using a high accuracy recognition setting higher in recognition accuracy than the standard recognition setting, when the host vehicle does not start based on a condition that it is not determined that the second preceding vehicle has started.

7. The vehicle control system according to claim 1, wherein
the slipping-by vehicle passes by a side of the host vehicle and approaches the preceding vehicle.

8. The vehicle control system according to claim 3, wherein
it is determined that the first timing indicates the second timing, when the first timing is within a predetermined time from the second timing.

9. The vehicle control system according to claim 3, wherein
it is determined that the slipping-by vehicle has been lost when the slipping-by vehicle becomes undetectable.

* * * * *